United States Patent
Meyer et al.

(10) Patent No.: US 11,252,855 B2
(45) Date of Patent: Feb. 22, 2022

(54) AGRICULTURAL SEED TREATMENT CONTROL SYSTEM FOR LIQUID AGROCHEMICALS

(71) Applicant: KSi Conveyor, Inc., Sabetha, KS (US)

(72) Inventors: Dominic E. Meyer, Sabetha, KS (US); Jason P. Kaeb, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 434 days.

(21) Appl. No.: 16/110,944

(22) Filed: Aug. 23, 2018

(65) Prior Publication Data

US 2019/0059205 A1 Feb. 28, 2019

Related U.S. Application Data

(60) Provisional application No. 62/549,006, filed on Aug. 23, 2017.

(51) Int. Cl.
*A01C 1/06* (2006.01)
*B05C 3/00* (2006.01)

(52) U.S. Cl.
CPC . *A01C 1/06* (2013.01); *B05C 3/00* (2013.01)

(58) Field of Classification Search
USPC .... 118/13, 19–24, 29, 683, 684; 427/212, 4, 427/8
See application file for complete search history.

(56) References Cited

U.S. PATENT DOCUMENTS 5,537,914 A * 7/1996 Gibney ................ B67D 1/0016
427/101.19

6,186,193 B1 * 2/2001 Phallen ..................... B65B 3/30
141/100
8,644,993 B1 2/2014 Craft et al.
(Continued)

FOREIGN PATENT DOCUMENTS

WO 2008016368 A1 2/2008

OTHER PUBLICATIONS

ASCO, Air and Water Solenoid Valves, 3/2 Series 8316, Feb. 1, 2001, pp. 49-52.
(Continued)

*Primary Examiner* — Yewebdar T Tadesse
(74) *Attorney, Agent, or Firm* — Coughlin Law Office, LLC; Daniel J. Coughlin; Stuart M. Aller

(57) ABSTRACT

A seed treatment applicator for applying a liquid seed treatment to an agricultural seed within a treatment chamber. A multi-port valve allows a first liquid source and a second liquid source to be fluidly connected to the multi-port valve. Multiple liquid sources may contain the same liquid treatment, mixed differently to have different densities. A liquid pump, such as a static rate pump, is fluidly connected downstream of the multi-port valve or directly connected to a liquid source. A modular control stick comprises a frame mounted to the treatment chamber, a mass flow meter mounted to the frame and fluidly connected downstream of the liquid pump and configured to generate a measured mass flow signal relative to a real time mass flow rate of the liquid seed treatment; and a flow meter transmitter operably connected to the mass flow meter and configured to generate a switch signal when comparison of the measured mass flow signal deviates from a reference value corresponding to a desired flow rate.

18 Claims, 9 Drawing Sheets

(56) References Cited

U.S. PATENT DOCUMENTS

| | | |
|---|---|---|
| 9,510,584 B2 | 12/2016 | Dull et al. |
| 9,658,624 B2 | 5/2017 | Ochampaugh |
| 2004/0057334 A1 | 3/2004 | Wilmer et al. |
| 2006/0255060 A1* | 11/2006 | Miller ................. A01C 1/08 222/63 |
| 2011/0027479 A1 | 2/2011 | Reineccius et al. |
| 2012/0189762 A1* | 7/2012 | Reineccius ........... G06Q 50/02 427/4 |
| 2013/0292407 A1 | 11/2013 | Beavis et al. |
| 2017/0189868 A1 | 7/2017 | Meyer et al. |
| 2017/0215331 A1 | 8/2017 | Reineccius et al. |
| 2017/0274331 A1 | 9/2017 | Edelman et al. |
| 2018/0352720 A1* | 12/2018 | David ................... B01F 7/16 |

OTHER PUBLICATIONS

USC, LPX Mass Flow Meter Rev B Manual Pumpstand, Operators Manual, May 7, 2015, 28 pages.

\* cited by examiner

Fig. 5

Controller

230 — Access a seed treatment recipe comprising a first agrochemical

232 — User Initiates Seed Treatment

234 — Generate first flow signal

236 — Generate first source select signal

238 — Monitor the first flow rate signal

240 — Monitor the first temperature signal

242 — Calculate adjustments based on the first temperature signal to change one or more of the seed flow rate, drying drum retention time, drying drum rotation speed, conditioned air flow rate, conditioned air temperature, conditioned air humidity, rotation speed of the atomizing disk 244 — Record the first temperature signal with operational data of the seed treatment application

Flow Regulator

248 — Receive the first flow signal

250 — Open flow regulator

Multi-Port Valve

252 — Receive a first source select signal

254 — Open valve for first agrochemical source

Mass Flow Meter

256 — Generate a first flow rate signal corresponding to the flow rate of the first agrochemical 258 — Generate a first temperature signal corresponding to the temperature of the first agrochemical

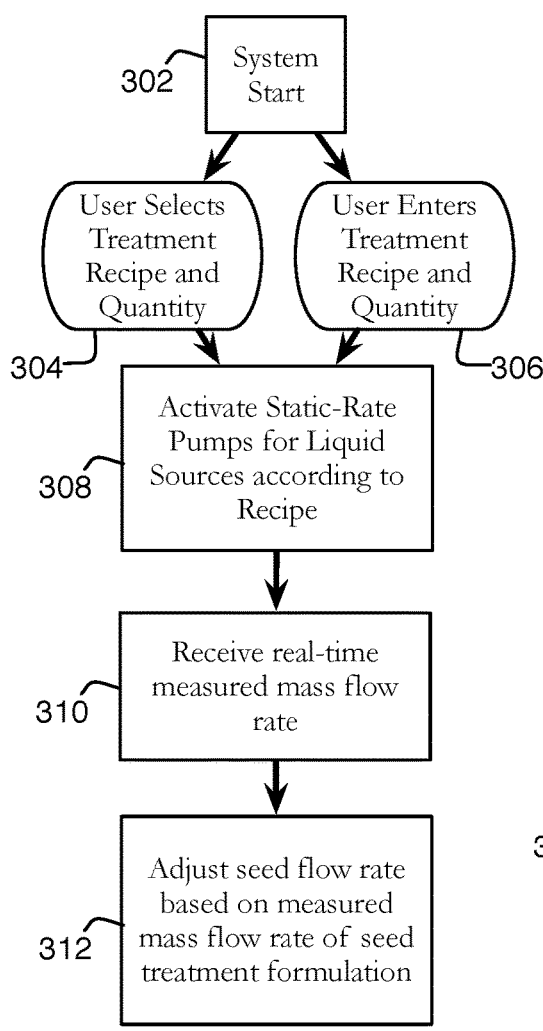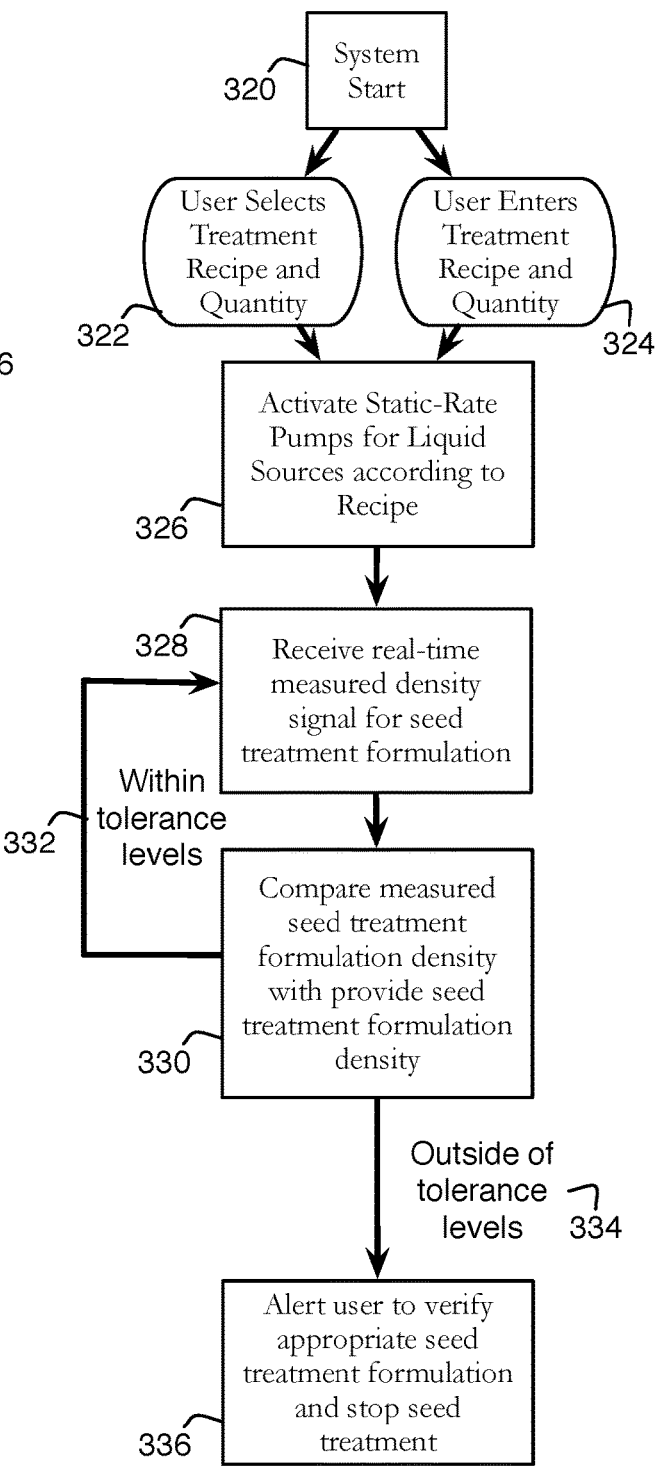

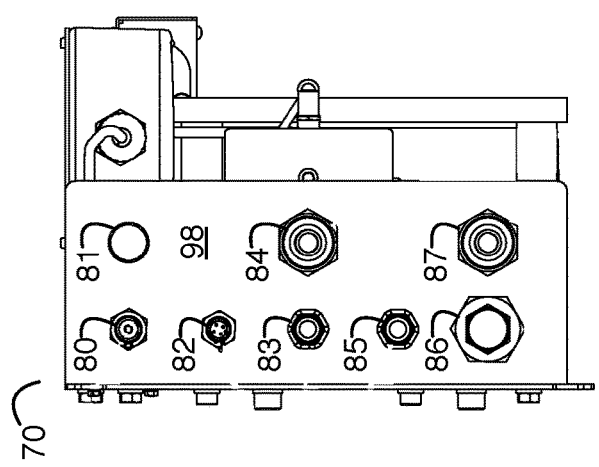
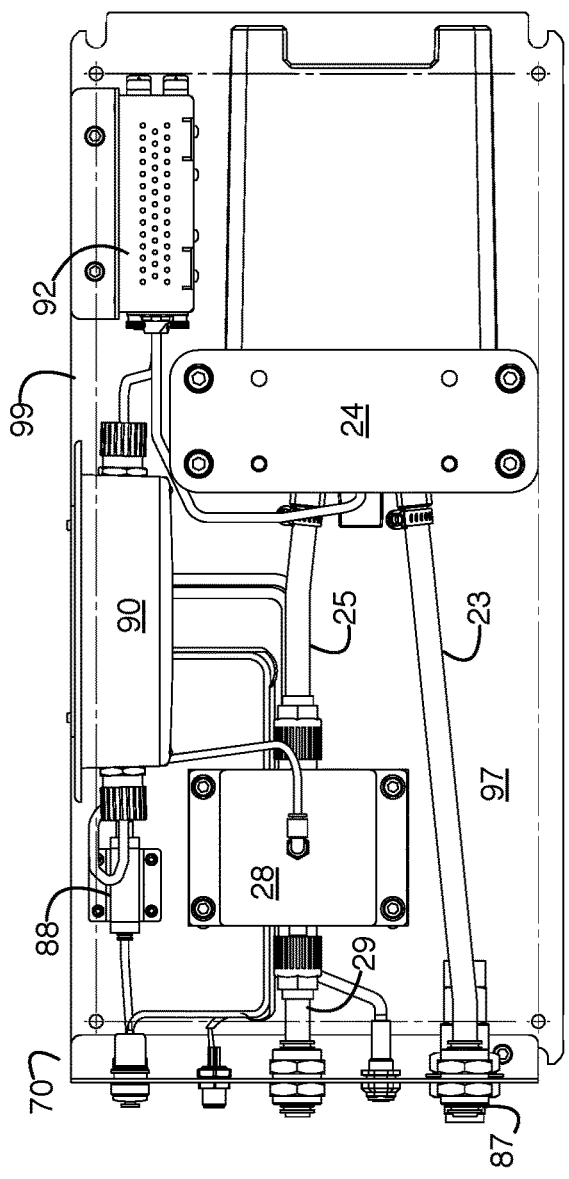

AGRICULTURAL SEED TREATMENT CONTROL SYSTEM FOR LIQUID AGROCHEMICALS

CROSS REFERENCES

This application claims benefit to U.S. Provisional Application No. 62/549,006, filed on 23 Aug. 2017.

REFERENCE TO CDS

Not Applicable.

FIELD OF THE INVENTION

The present disclosure relates to the technical field of treating agricultural seed commodities. Particularly, an electric control system for accurately and precisely controlling the application of liquid agrochemicals from one or more supply tanks.

BACKGROUND

Agricultural seeds are often treated with agrochemicals such as insecticides, fungicides, inoculants, and other compositions before planting. Seed dealers must quickly treat and deliver a high volume of seed to farmers who are ready to plant their fields. These seed treatments are commonly applied to the surface of the agricultural seed by spraying a liquid composition to the seed surface. This requires a smaller quantity of seed treatment composition than the traditional field application of treatment fluids.

In treating agricultural seed with agrochemicals, it is important that the proper amount of liquid agrochemical is applied to each seed. Under-application of the seed treatment agrochemical results in an ineffective insecticide, fungicide, or inoculant. Over-application of the seed treatment agrochemical wastes expensive agrochemical material. Metering is currently accomplished with one of the following: volumetric flow meter, mass flow meter, or rate-of-change using a scale. In these systems, the flow rate is changed by altering the speed of a variable speed pump.

SUMMARY

We disclose a seed treatment apparatus and methods that satisfies the need to accurately apply liquid agrochemicals to agricultural seed at high flow rates from one or more supply tanks without interruption in the seed treatment application process.

We disclose an apparatus and process for automatically measuring and controlling the flow rate of a liquid product in a seed treatment system using a constant pressure pump, mass flow meter, flow regulator and controller. A control system constantly monitors flow rate and makes real-time adjustments to flow regulator based on selected recipe and seed flow rate. This apparatus and process provides at least the following advantages over existing control systems a) Capable of legal-for-trade transaction for liquid dispensed;
b) Receives real-time density to verify product being applied;
c) Unlike rate-of-change or scale system, there will be no external influence—such as wind, rain, hail, debris, or vibration from nearby equipment—that could affect the application rate or amount;
d) Ability to add or change out liquid on the fly—the user cannot add liquid to a rate-of-change system with a scale without compromising the application rate calculation;
e) Real-time density measurement removes all calibration and density calculation processes, removing an error-prone step essential for the application rate calculation in other application methods.

The seed treatment system comprises an air diaphragm pump to pressurize the seed treatment fluid. The air diaphragm pump provides a flow of liquid agrochemicals at a constant pressure. The air diaphragm pump could be substituted by several different types of liquid pumps such as centrifugal, diaphragm, gear, lobe, peristaltic, progressive cavity, screw, or submersible. The pump could also be substituted by pressurizing the liquid in the supply tank, making the supply tank a pressure can. One advantage to the use of the diaphragm pump is the improved negative pressure. The diaphragm pump allows the source of product to be placed further away from liquid stand pumping system. This allows much more flexibility for equipment placement. This can be important when pumping agrochemicals, which can be hazardous if spilled and are subject to substantial regulations. The ability to place the liquid source far away from the pumping system is also important because some seed treatment system sites require forklifts or other heavy equipment to move and replace the liquid agrochemical source tank.

A Coriolis mass flow meter provides real-time density measurements and mass flow rate of liquid agrochemical to the control system. The Coriolis mass flow meter also provides real time temperature measurements of the liquid agrochemical. We realized that the user density calculation and calibration step was a common source for introducing error into the seed treatment system. The density calculation and calibration step also increased the amount of time for starting up a seed treatment system. Furthermore, density changes based on temperature. During the seed-treating season, the temperatures can be cold in the morning but quite warm in the afternoon. It is inconvenient for the user to manually recalculate density for accurate application of seed treatment agrochemicals to the agricultural seed multiple times per day. Further, existing seed treatment systems are configured to measure atmospheric conditions. However, the seed treatment agrochemical warms and cools differently depending on the size of the container and the location of the temperature measuring instruments. We realized that using a Coriolis mass flow meter allows the system to measure the real-time temperature and density of the actual liquid agrochemical flowing to the seed treatment system. This allows the control system to alter the seed treatment application and mixing, polishing, and drying parameters based on the temperature of the seed treatment agrochemical applied to that seed without requiring time-intensive measurements, calculations, and calibrations.

A flow regulator regulates the flow of liquid as defined by the controller in response to a user selected seed treatment recipe. The flow regulator-such as pneumatically or electronically controlled proportional valves-allows for the control of the flow rate of a respective liquid agrochemical. We recognized that incorporating a flow regulator removes the requirement for a variable rate pump. One advantage to the use of flow regulators is placement of the flow-regulating device nearer the point of mixing and delivery. This is advantageous over the use of variable rate pumps, since variable rate pumps generally need to be located nearer the liquid source.

A control system provides a closed loop, PID control of the pump, meter and regulator to achieve a set point of liquid. The set point of each liquid agrochemical is entered into the control system either directly or by accessing a stored recipe. The control system activates the pump. The control system receives the real-time measured mass flow rate from the Coriolis mass flow meter and commands a respective flow control signal to each of the flow regulators.

The control system may be configured to automatically switch between multiple sources of the same agrochemical. For example, when a first agrochemical source is emptied—or close to emptied—then the system switches a multi-port valve to draw from a second agrochemical source containing the same agrochemical. For example, the system can be configured with a certain flow rate tolerance. When the flow rate signal generated by the mass flow meter fluctuates in excess of the determined flow rate tolerance, then the system activates a multi-port valve to select a second fluid source. The user is notified to check the first agrochemical source.

The control system may be configured to verify seed treatment agrochemicals based on a known characteristic of the selected seed treatment agrochemical. For example, if the density of the seed treatment agrochemical is known, then the system compares whether the measured density deviates from the known reference density value of the selected seed treatment agrochemical. If the measured density is greater or less than the known density—within a given tolerance—then the system can generate an alert to the user. The control system can also pause the seed treatment application until the user verifies that the correct seed treatment agrochemical is fluidly connected.

The control system of this current disclosure may be configured to change seed treatment application based on the real-time temperature of the liquid agrochemical. We discovered that the control system can be configured to calculate adjustments to parameters related to the liquid seed treatment agrochemical application as well as the mixing, polishing, and drying stages. The mass flow meter generates a first temperature signal corresponding to the temperature of the first agrochemical. The control system receives and monitors the first temperature signal. Based on the first temperature signal, the control system calculates adjustments to change one or more of the seed treatment parameters. The seed treatment parameters comprise: seed flow rate, drying drum retention time, drying drum rotation speed, conditioned air flow rate, conditioned air temperature, conditioned air humidity, rotation speed of the atomizing disk, heating elements disposed in the supply tank, or application rates of dry products such as increasing the talc applied.

In one embodiment, a fluid pump, flow meter, and liquid flow regulator are connected to each liquid source. In another embodiment, a fluid pump, flow meter, and liquid flow regulator are connected to a plurality of liquid sources through a multi-port valve. The multi-port valve can be switched between each of the liquid sources.

In one embodiment, multiple agrochemicals are combined at a fluid manifold 32. The fluid manifold 32 is connected to a static mixer 54, where the various liquids are blended together. The fluid manifold 32 is connected to a delivery coupling, for dispensing the blended liquid into a receptacle. A control system is electrically coupled to the mass flow meter, static pumps, and liquid flow regulators. The control system is configured to receive an electrical signal generated by each flow meter. The control system is also configured to generate an electric control signal to control the respective flow regulators in response to a recipe.

In one embodiment, this control system produces accurately blended product at high flow rates with minimal amounts of waste product. The automated liquid blend system disclosed utilizes flow regulators to control the rate of liquid flow near the point of delivery, which allows the system to rapidly react to changes in liquid flow. The system is also capable of simultaneously delivering individual liquids at full speed into a mixing point, thereby reducing the processing time. Another advantage of the current disclosure is the elimination of a separate mixing tank, which saves time, expense, and waste.

In one embodiment, the seed treatment system can pull seed treatment formulas from any type of source without manual density calibrations. One limitation to the use of scales in loss-in-weight systems is that the size of the seed treatment formula source tanks must fit on the scale surface. Users are limited to using seed treatment kegs that are small and manually handleable or their site must accommodate proper machinery to move larger kegs on and off of the scale. The driver of the machinery is required to carefully position the seed treatment keg on top of the scale surface. With these small keg sizes, the user likely replaces the seed treatment keg over 20 times. That results in 20 different downtimes for each seed treatment formulation. We discovered that the Coriolis mass flow meter allows the seed treatment system to pull from any size seed treatment keg, shuttle (such as a 200 gallon shuttle), or tank (such as a 300 gallon stainless steel tank). We also discovered that fluid sources can be more quickly switched. In existing system, the empty container must be removed from the scale before a new container can be placed on top of the scale. Then the scale has to be zeroed before treating can resume. We discovered that two fluid sources can be positioned adjacent to each other. As soon as the first source is emptied, the fluid connection to the tank can be switched to the second source without moving the tanks or zeroing a scale. This reduces downtime of the seed treatment system when one of the agrochemical source containers is emptied or otherwise needs to be switched. Alternatively, as discussed above, the system can be automated to switch from an empty source keg without interruption by using a multi-port valve.

This disclosure is also specifically useful when one or more of the seed treatment liquids contains a controlled or hazardous substance, such as a pesticide, herbicide, or fertilizer. The user is not required to lift the tanks into place on an elevated scale. The tanks can be placed directly on the ground or in a chemical containment device.

In embodiments containing a seed treatment shuttle or tank, it may be important to include a mixing device to maintain proper mixing of the seed treatment fluid. For example, a stinger mixer can be inserted into the shuttle or tank to maintain consistent concentration of the seed treatment chemical or inoculant.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein:

FIG. 5 shows a flow chart of an embodiment of Changing Seed Treatment Application Based on Temperature of Liquid Agrochemical.

FIG. 6 shows a flow chart of a method for adjusting the flow rates based on the measured mass flow signal.

FIG. 7 shows a flow chart of a method for alerting the user to verify appropriate seed treatment formulation and stop treatment based on density range being out of tolerance.

FIG. 10 is an enlarged front view of the modular control sticks of the embodiment of FIG. 9.

FIG. 11 is an enlarged side view of the modular control sticks of the embodiment of FIG. 9.

DETAILED DESCRIPTION

As noted above, this seed treatment control system for liquid agrochemicals overcomes numerous problems, such as required user calibrations, external interference with scale systems, liquid source changes without interruption, and broader equipment size and placement restrictions.

Figure 1:
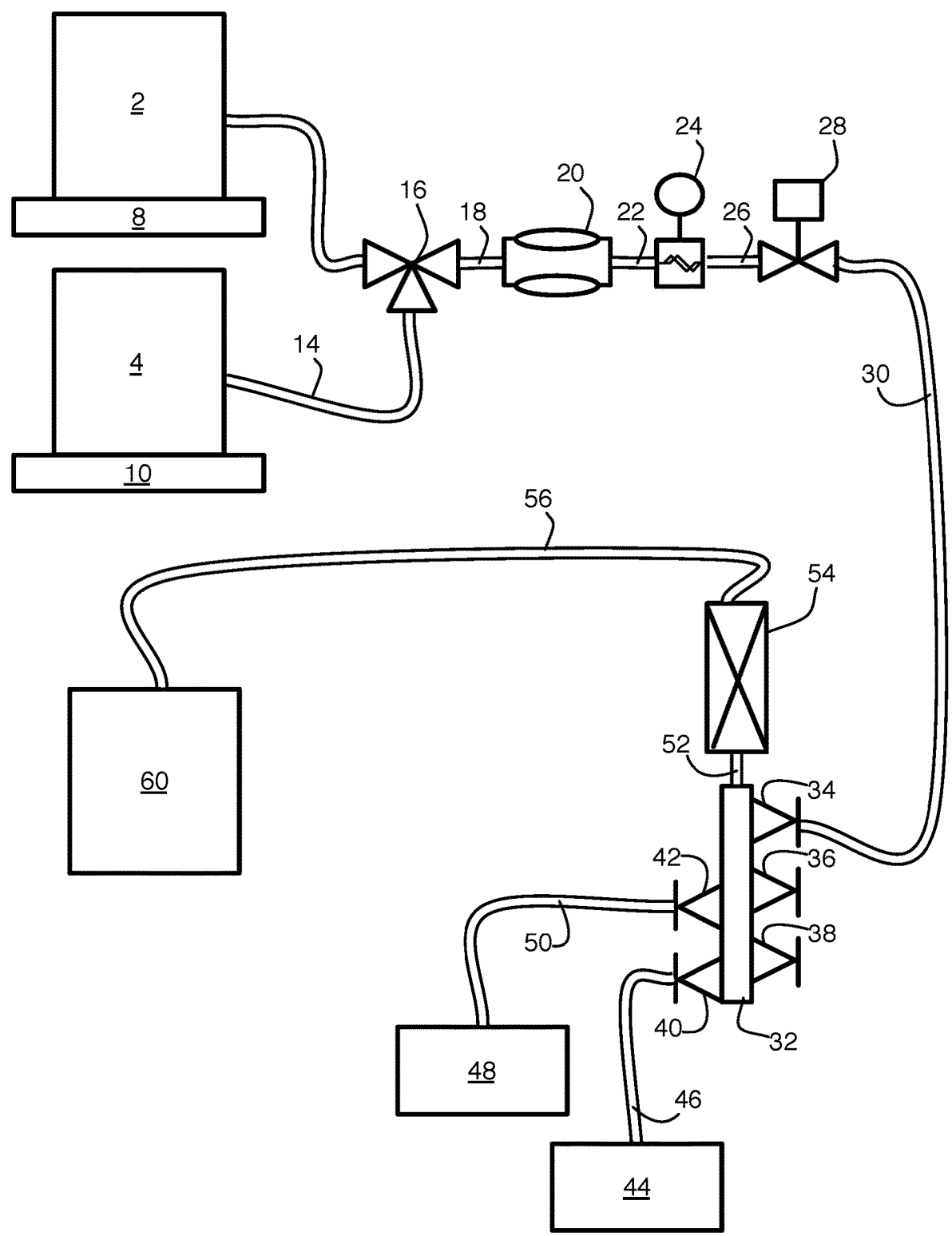
FIG. 1 depicts a schematic view of an embodiment of the seed treatment control system for liquid agrochemicals.

As illustrated in FIG. 1, a mass flow meter 24 is in fluid communication with each liquid source 2, 4. The mass flow meter 24 is fluidly connected downstream of the liquid pump 20 through fluid connection 22. The mass flow meter 24 generates an electric signal relative to the mass of the liquid flow.

The liquid source 4 is fluidly connected to the multi-port valve 16 by a fluid connection 14, such as a tube. A pump 20 is in fluid communication with the liquid source via fluid connection 18. The pump is preferably an air operated, double diaphragm pump. The double diaphragm air pump may be advantageous because it can hold a constant pressure on the fluid line without compromising the pump 20. As liquid pressure builds, the pump 20 slows down until the liquid pressure drops. The pump 20 remains energized and the fluid remains pressurized. The pump 20 can maintain a potential liquid flow rate without negatively affecting pump 20.

The pump 20 must have sufficient pressure capabilities to satisfy the plumbing requirements of the system. The pressure requirements are based on the plumbing arrangement. The pressure drops through tubing, check valves, and across the static mixer 54.

In one embodiment, a flow meter is in fluid communication with each liquid source. The flow meter could be a volumetric flow meter or a mass flow meter 24. An example of a volumetric flow meter is a magnetic flow meter. Volumetric flow meters must be calibrated for each product that is put through it. The flow meter provides an individual flow rate signal corresponding to the flow rate for each product. The control system is configured to receive each individual flow rate signal. The flow meter generates a flow rate signal for each liquid source product. In one embodiment, the flow meter generates an analog electric signal corresponding to the flow rate for each product. The flow meter is in electric communication with the control system.

In one embodiment, the flow meter is a mass flow meter 24, such as a Corilios mass flow meter. The mass flow meter 24 would be advantageous to eliminate the calibration step for the volumetric flow meter. The mass flow meter 24 provides electronic signals corresponding to the real-time mass flow rate, density, and temperature of the fluid using direct inline measurement. The mass flow meter 24 is configured to calculate a volumetric flow rate and a totalized fluid ounces per operation cycle. A proportional-integral-derivative ("PID") control loop determines whether the measured mass rate deviates from the programmed desired mass rate reference value. The operator or programmer can affect the compensation value to tune flow rate adjustments. Tuning of the flow rate adjustment may depend on the viscosity of the fluid and the desired mass rate.

In one embodiment, the meter used to generate the flow signal is a mass meter—such as a scale with a load cell—that receives the fluid source container. The mass meter generates a mass flow signal. The control system is configured to calculate a flow rate based on a loss-in-weight calculation of the change in mass signal over a time interval.

A liquid flow regulator 28 is in fluid communication with the liquid source downstream of the mass flow meter 24 and connected to the mass flow meter by a fluid connection 26. The liquid flow regulator 28 provides control over the flow rate of the product. In one embodiment, the control system sends an analog control signal that is received by the liquid flow regulator 28. The liquid flow regulator 28 responds proportionately. For example, the liquid flow regulator 28 can comprise an electro-pneumatic valve, which converts analog electric signal to pneumatic control over the valve, thereby affecting the flow rate. The liquid flow regulator 28 is positioned downstream from flow meter because the regulator 28 causes the flow of the liquid to be turbulent. In one embodiment, the liquid flow regulator 28 is comprised of Teflon to increase compatibility with a variety of products.

As disclosed above, multiple liquid sources can be fluidly connected with a pump 20, mass flow meter 24, and fluid regulator 28. In FIG. 1, the first seed treatment fluid source #1 and the first seed treatment fluid source #2 are connected to a single pump 20, mass flow meter 24, and liquid flow regulator 28 through a three-way valve.

The agricultural seed treatment control system for liquid agrochemicals can be described as having respective fluid handling assemblies for each seed treatment fluid. Each fluid handling assembly comprises a static-rate pump for each fluid source. Each fluid handling assembly has at least one inlet fluid connection for connecting to a respective fluid source and an outlet fluid connection for directing a first pressurized fluid. Each fluid handling assembly comprises a meter that generates a fluid signal in relation to the amount of the fluid flowing from the fluid source. Each fluid handling assembly also comprises a proportional valve fluidly connected downstream of the meter, the proportional valve biased in a closed position.

Each proportional valve receives the respective control signal; and each proportional valve opens in response to the respective control signal whereby a desired flow rate of each fluid is continuously delivered to a downstream mixing assembly.

In one embodiment, a liquid manifold 32 is in fluid communication with each fluid handling assembly. In FIG. 1, the flow regulator 28 is shown connected to a first port 34 of the liquid manifold 32 through fluid connection 30. The liquid manifold 32 is a chamber for receiving multiple liquid source connections. For example, the liquid manifold 32 could be an aluminum manifold 32 with multiple ports 34, 36, 38, 40, 42. In FIG. 1, a third liquid source 44 is directly connected via fluid connection 46 to port 40 on the manifold. Additionally, a forth liquid source 48 is connected via fluid connection 50 to port 42. The function of the liquid manifold 32 is to combine the multiple fluid sources into a single output. The liquid manifold 32 has a plurality of inlet ports to allow connections from a plurality of liquid sources. The liquid manifold 32 discharges the single output into the inlet for the liquid atomizer within the seed treatment chamber 66.

In one embodiment, the liquid manifold 32 is oriented vertically, with output flow out the top. In making the fluid connections between the liquid sources and the manifold 32, the higher rate sources are connected into bottom, lower rate product in through the top. In other words, the higher rate liquid connections are located furthest from the discharge point and the lower rate liquid connections are located closer to the discharge point. This allows the higher rate liquid product flow to carry the lower rate liquid through the liquid manifold 32.

In one embodiment, a one-way check valve is in fluid communication with each port of the manifold 32. The check valves prevent liquid back-flow. This allows the system to avoid cross contamination from one recipe to another. In a preferred embodiment, the check valves are self-sealing, non-reactant and not dependent on gravity, mounting position, or reverse flow.

In one embodiment, a mixing assembly having a static mixer 54 is in fluid communication with the liquid manifold 32 via fluid connection 52. The static mixer 54 can be an inline static mixer, which creates a mixing action as the liquid moves through the static mixer 54. The static mixer 54 incorporates a turbulence-inducing mixing element in the liquid flow path. These turbulence-inducing mixing elements can have specific shapes and sizes—such as a blade, helix, or wafer—to efficiently cause the liquids to blend. The specific design of the static mixer 54 would depend on the characteristics of the liquids to be blended in a specific application.

In one embodiment, the static mixer 54 is oriented vertically. Liquid flows up through the static mixer 54. The vertical orientation is advantageous because the liquid flow can vary. It is important that the liquid does not merely trickle through the static mixer 54. The vertical orientation—with liquid entering through the bottom—assures that liquid only progresses through the static mixer 54 32 when the volume of the static mixer 54 is full of liquid. This is especially important when the fluid sources have different characteristics, such as differing solubility or viscosity characteristics, which could result in the various liquids layering. Passing through the static mixer 54 allows even stiff, gel-like fluids to be broken apart and blended with other fluids.

As shown in FIG. 1, the static mixer 54 is fluidly connected with a seed treatment applicator 60 via fluid connection 56. The seed treatment applicator atomizes the seed treatment fluid upon a seed flow according to a recipe. Alternatively, the seed treatment liquids are delivered into a delivery shuttle. The delivery shuttle is a liquid container that receives the blended liquid. In one embodiment, the delivery shuttle is a one-time use receptacle. The delivery shuttle can be sized as appropriate for the quantity of liquid desired by the customer. In one embodiment, the delivery shuttle is a 260-gallon container. In another embodiment, the delivery shuttle can be a standard 5-gallon bucket. In one embodiment, the delivery shuttle is positioned on a scale for measuring the mass of blended liquid delivered into the delivery shuttle.

An air purge valve may connected to the liquid manifold 32. The air purge valve can be opened to provide a flow of compressed air from a compressed air source to purge residual fluid at the end of the blending delivery cycle. Substantially all liquid product needs to be removed from the manifold 32 and downstream of the manifold 32. The air purge forces liquid through liquid connections into the shuttle or through a discharge fluid connection. This provides the customer with a complete delivery of product and also provides an initial cleaning of the blended product. The air purge provides a medium that naturally separates from the blended liquid product. The control system can be programmed to automatically trigger the air purge at the end of blending delivery cycle.

A solvent purge valve is also connected to the liquid manifold 32. The solvent purge valve can be opened to provide a flow of pressurized solvent from a pressurized solvent source to purge residual fluid at the end of the blending delivery cycle and after the air purge. The solvent purge flushes residual fluid from the system. Generally, this waste solvent mixture must be collected and disposed of. The air purge step minimizes the amount of solvent necessary to clear the system of residual liquid. In one embodiment, the solvent used is water. The control system can be programmed to automatically trigger the solvent purge at the end of blending delivery cycle and after the air purge.

A pneumatic source may be connected to the air-in port 80 of the control stick 70 to operated the flow regulator 28. The pneumatic source may also be connected to each of the pumps, valves, and regulating proportional valves.

The control system receives each fluid signal each mass flow signal. The control system is in electric communication with the various air valves, liquid flow regulators (proportional valves), and each of the static-rate fluid pumps. The control system generates a control signal for each proportional valve based on the respective fluid signal and a treatment recipe. Each proportional flow regulating valve receives the respective control signal opens in response to the respective control signal whereby a desired flow rate of each fluid is continuously delivered to a downstream mixing assembly.

The modular system is designed to accommodate multiple liquid sources, in some embodiments of the modular system there are between 2 to 20 liquid sources. Additional capacity can be added to the system by adding additional control sticks 70, 72. Modular control sticks 70, 72 may also provide the advantage of continued operation in case of equipment failure. For example, if a component within the control stick would fail during the seed treatment season, a replacement control stick could be quickly and easily swapped for the faulty control stick. The modularity of the control sticks also provide easy opportunity for the User to add capacity to their seed treatment system. For example, if a User desires to add additional fluid sources, then an additional modular control stick can be added to the seed treatment system and connected in series alongside the other modular control sticks.

Alternative to a Coriolis mass flow meter 24, certain embodiments may incorporate a density meter such as a Berthold Technologies SmartSeries LB 414 Gamma Densitometer. The Gamma Densitometer utilizes a radiometric detector to generate respective signals relative to the liquid's density, concentration and solids content measurements.

As shown in FIGS. 10 and 11, the seed treatment applicator can comprise one or more modular control sticks 70, 72. The first liquid source 2 and second liquid source 3 are fluidly connected to the first liquid pump 20 through a multi-port valve 16. Fluid connection 18 fluidly connects the output of the first liquid pump 20 with a fluid-in port 87 on the first modular control stick 70. A third liquid source 44 is fluidly connected to a second liquid pump 21 directly. The second liquid pump 21 is fluidly connected to a second modular control stick 72. The modular control sticks 70, 72 are swappable units for controlling the flow of the liquid from the respective liquid source and for generating signals corresponding to the mass flow rates, density, and temperature of the liquid seed treatment.

Figure 9:
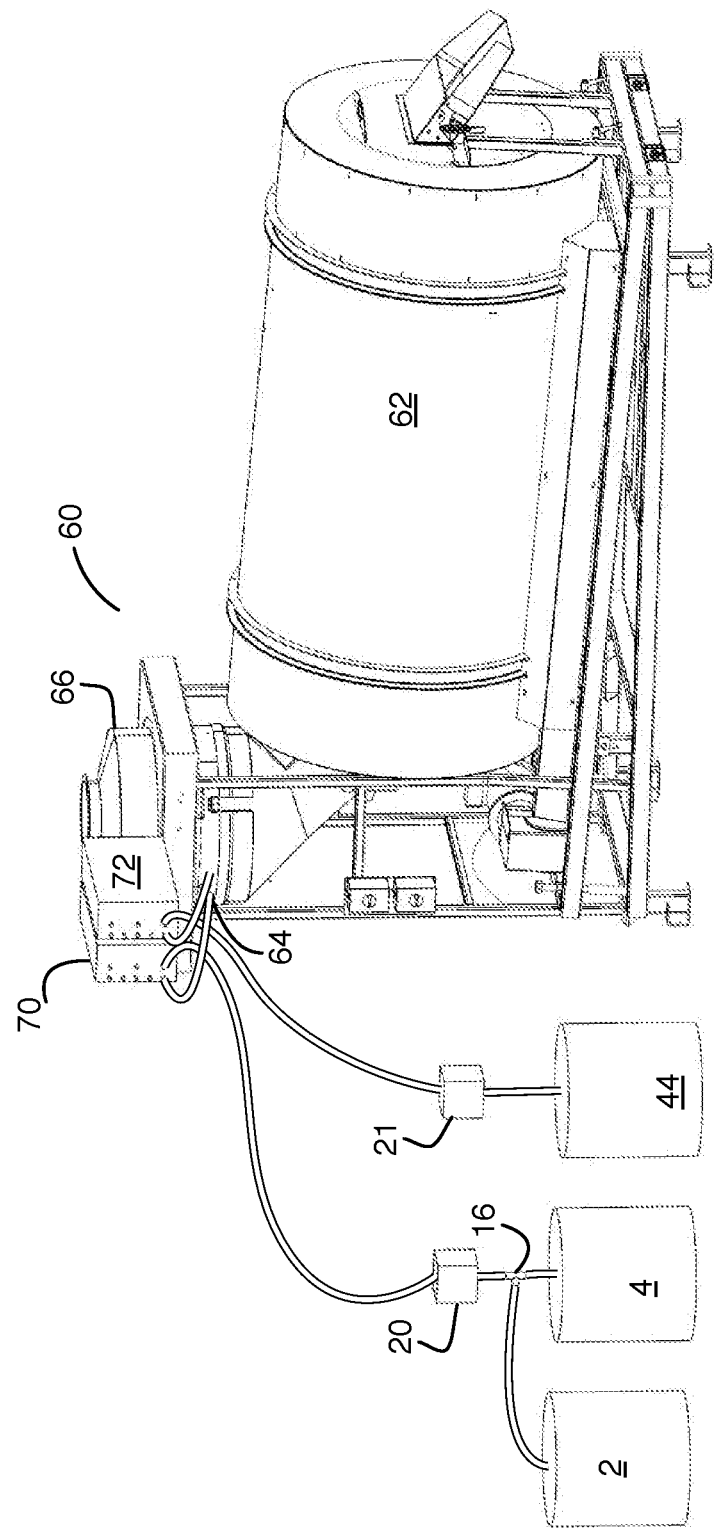
FIG. 9 an embodiment of a seed treatment applicator system showing multiple liquid sources and a pair of modular control sticks, each control stick containing the respective mass flow meters and flow regulators.

The modular control sticks are shown in FIG. 9 as mounted to the treatment chamber 66. In this way, the modular control sticks 70, 72 measure the liquid seed treatment at a point in the fluid system physically near the point of use. Use of the modular control sticks 70, 72 allows the seed treatment applicator to utilize static rate pumps that maintain a constant positive pressure over long distances. For example, the fluid sources 1, 2, 4 and the pumps 20, 21 may be located up to 20' from the modular control sticks 70, 72. In some cases, the fluid sources 1, 2, 4 and the pumps 20, 21 may be located up to 100' from the modular control sticks 70, 72. Another advantage to moving the fluid sources 1, 2, 4 at a greater distance from the modular control sticks 70, 72 is to facilitate the replacement or filling of the liquid sources in a more readily accessible portion of the seed treatment facility. The fluid sources 1, 2, 4 may also be kept in a controlled environment apart from the other equipment.

The modular control sticks 70, 72 comprise a frame 99 upon which a variety of ports are mounted on the front surface 98. The front surface 98 comprises an air-in port 80, a power in port 82, an Ethernet out port 83, an Ethernet in port 85, a fluid out port 84, a fluid in port 87, and an exhaust port 86. The fluid out port 84 is fluidly connected to the atomizer inlet port 64. A power button 81 is also mounted on the front surface 98. An elongated frame portion 97 is perpendicular to the front portion 98 of the frame 99. The mass flow meter 24, flow meter transmitter 92, flow regulator 28, flow regulator controller 88, and central processing unit ("CPU") box 90 are mounted to the elongated frame portion 97. A first internal fluid connection 23 connects the fluid in port 87 to the mass flow meter 24 downstream of the fluid in port. A second internal fluid connection 25 connects the mass flow meter 24 to the flow regulator 28 downstream of the mass flow meter. The flow regulator 28 is fluidly connected to the fluid out port 84 through a third internal fluid connection 29. The flow meter transmitter 92 is electrically coupled to the flow meter 24 to communicate flow value data to the monitoring system, such as the CPU box 90 and the main applicator control system with user interface.

Figure 2:
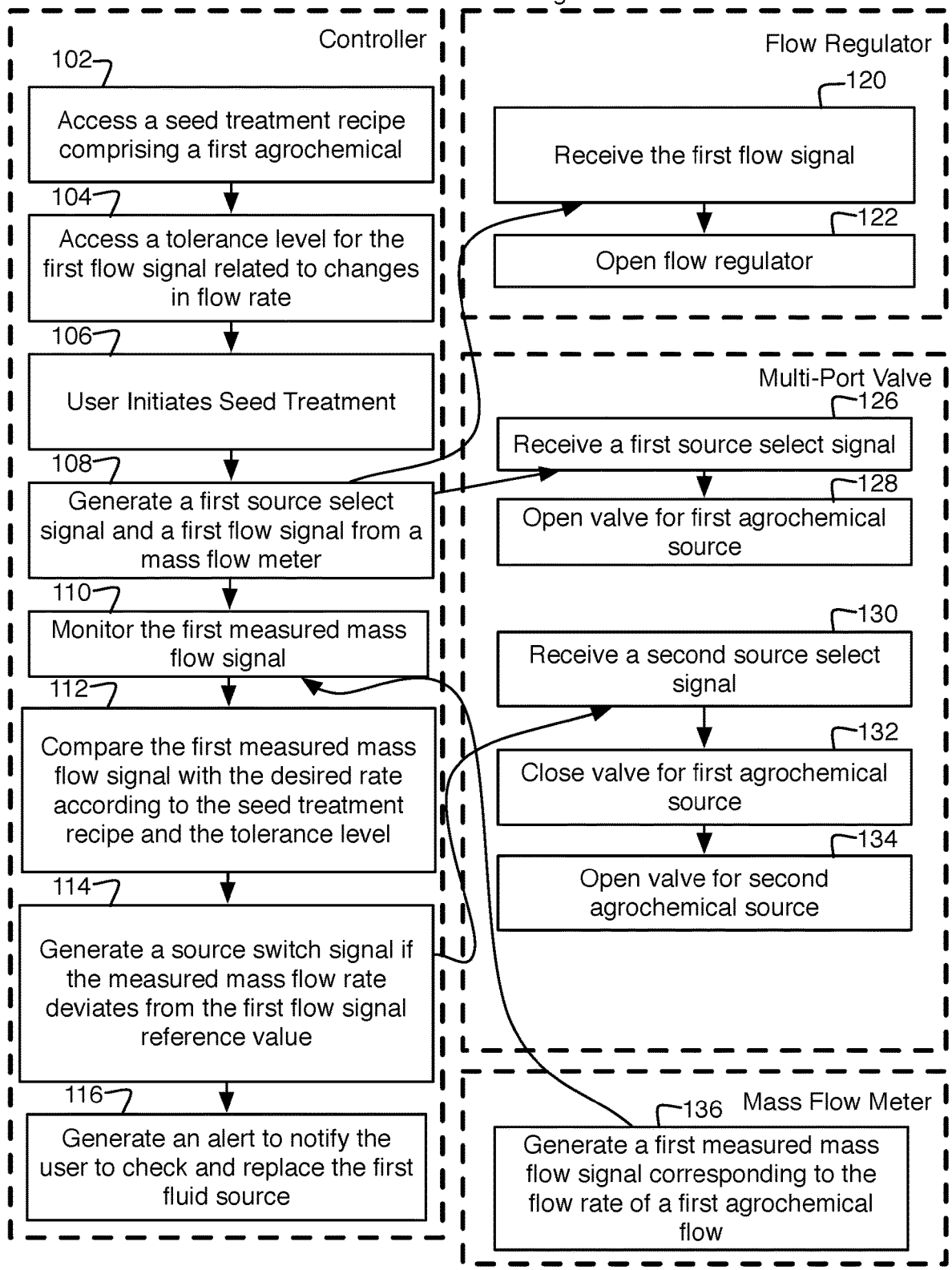
FIG. 2 shows a flow chart of an embodiment of Automated Switching of Chemical Sources.

As shown in FIG. 2, the fluid source of the liquid seed treatment can be automatically changed. The controller accesses a seed treatment recipe comprising a first agrochemical, as shown in Step 102. The controller accesses a tolerance level for the first flow signal related to changes in flow rate, as shown in Step 104. The user initiates seed treatment according to the seed treatment recipe, as shown in Step 106. The controller generates a first source select signal and a first flow signal from a mass flow meter, as shown in Step 108. The controller monitors the first measured mass flow signal, as shown in Step 110. The flow regulator receives the first flow signal, as shown in Step 120.

The flow regulator opens in response to the first flow signal, as shown in Step 122. The multi-port valve receives a first source select signal, as shown in Step 126. The multi-port valve opens the valve to select the first agrochemical source 128. The mass flow meter then generates a first measured mass flow signal corresponding to the flow rate of the first agrochemical flow, as shown in Step 136. The controller monitors the first measured mass flow signal. The controller compares the first measured mass flow signal with the desired rate according to the seed treatment recipe and the tolerance level, as shown in Step 112. The controller generates a source change signal if the measured flow signal deviates from the first flow signal, as shown in Step 114. In one embodiment, the multi-port valve 16 receives the source change signal, as shown in Step 130, and then closes the valve for the first agrochemical source, as shown in Step 132, and opens the valve for the second agrochemical source, as shown in Step 134. In one embodiment, the system generates an alert, such as a user error message, to notify the user to check and replace the first fluid source, as shown in Step 116. The user error message can be displayed upon the user interface of the controller. The multi-port valve 16 can be manually operated or an electro-pneumatic valve.

Figure 3:
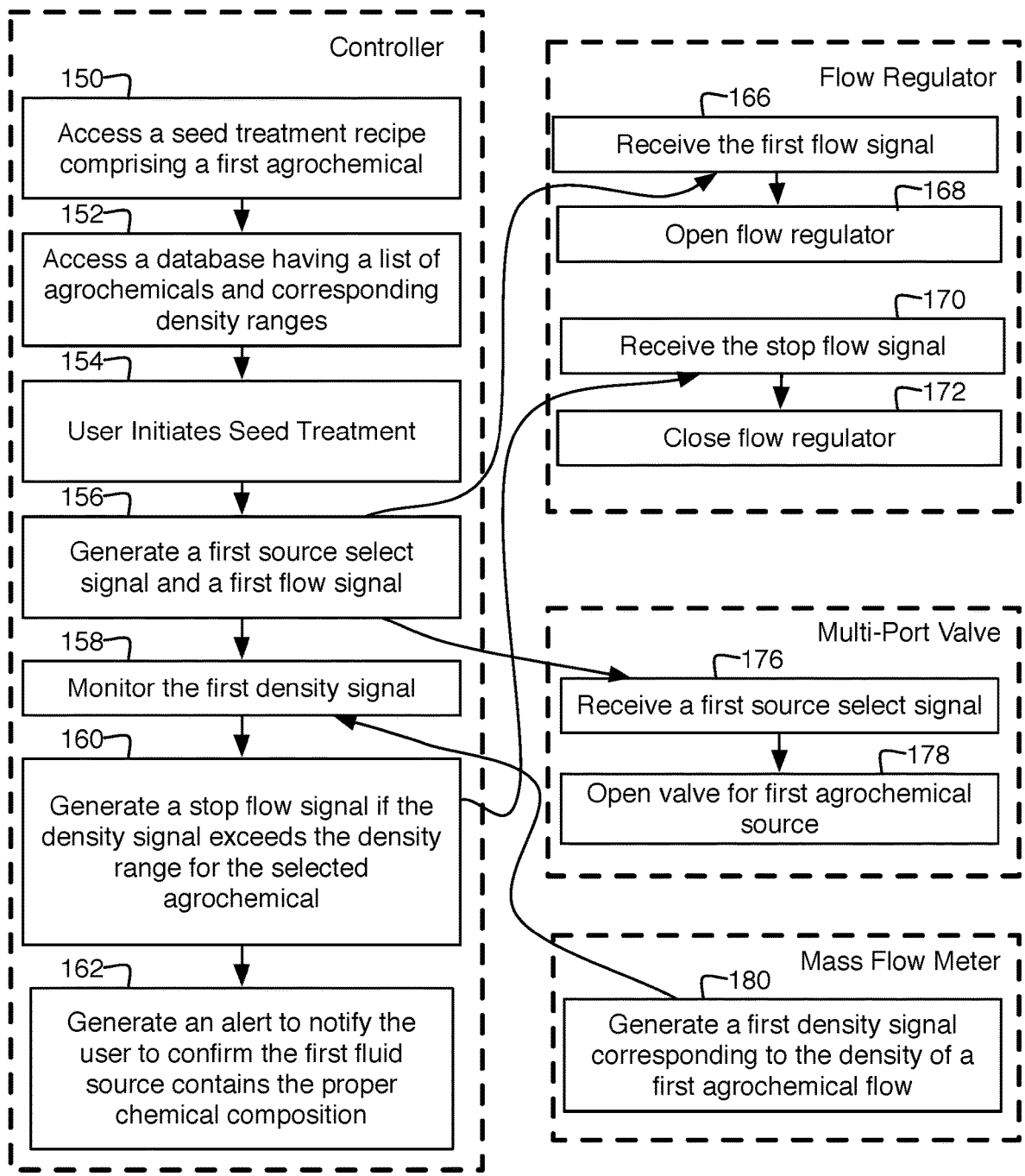
FIG. 3 shows a flow chart of an embodiment of Detecting Product Change by Change in Density.

As shown in FIG. 3, an agrochemical product change can be automatically detected by a change in in the direct inline measurement of the density of the liquid seed treatment. The controller accesses a seed treatment recipe comprising a first agrochemical, as shown in Step 150. The controller accesses a database having a list of agrochemicals and corresponding density ranges, as shown in Step 152. Alternatively, the user can manually input the density range of the selected agrochemical or the user may automatically input the density range into the controller by scanning a bottle or a product information sheet. The user initiates seed treatment through the controller, as shown in Step 154. The controller generates a first source select signal and a first flow signal, as shown in Step 156. The flow regulator receives the first flow signal, as shown in Step 166. The flow regulator proportionally opens in response to the first flow signal, as shown in Step 168. The multi-port valve, if present, receives the first source select signal, as shown in Step 176, and opens the valve to select the first agrochemical source, as shown in Step 178. The mass flow meter generates a first density signal corresponding to the direct inline measurement of the density of the first agrochemical, as shown in Step 180. The controller monitors the first density signal, as shown in Step 158. The controller generates a stop flow signal if the density signal exceeds the density range for the selected agrochemical, as shown in Step 160. The flow regulator receives the stop flow signal, as shown in Step 170, and closes the flow regulator to stop the flow of the first liquid seed treatment, as shown in Step 172. The controller may then generate an alert to notify the user to confirm the first fluid source contains the proper chemical composition, as shown in Step 162.

Figure 4:
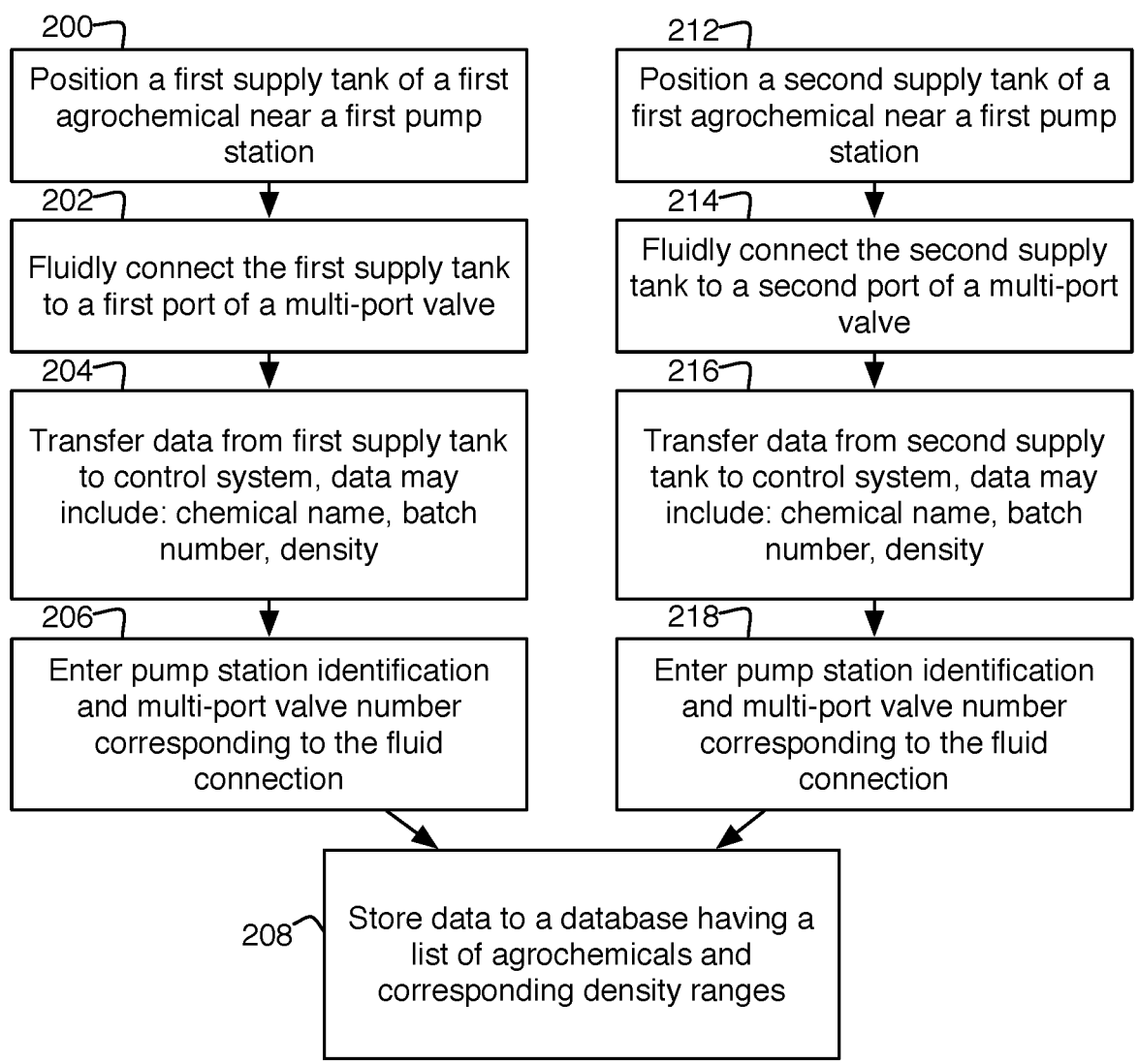
FIG. 4 shows a flow chart of an embodiment of Storing Agrochemical Data to Database.

As shown in FIG. 4, in agrochemical data can be stored to a database manually or directly. A first supply tank of a first agrochemical is positioned near a first pump station, as shown in Step 200. The first supply tank is fluidly connected to a first port of a multi-port valve, as shown in Step 202. Agrochemical data is transferred from a first supply tank to the control system, as shown in Step 204. The agrochemical data may include: chemical name, batch number, density, or safety and handling information. The user enters the pump station identification and multi-port valve number corresponding to the fluid connection 206. A second supply tank of the first agrochemical is positioned near the first pump station, as shown in Step 212. The second supply tank is fluidly connected to a second port of the multi-port valve, as shown in Step 214. Agrochemical data is transferred from a second supply tank to the control system, as shown in Step 216. The agrochemical data may include: chemical name, batch number, density, or safety and handling information. The user enters the pump station identification and multi-port valve number corresponding to the fluid connection 218. Then the system stores data to a database having a list of agrochemicals and corresponding density ranges, as shown in Step 208.

As shown in FIG. 5, parameters of the seed treatment application can be changed in real time based on inline direct measurement of the liquid agrochemical. The controller accesses a seed treatment recipe comprising a first agrochemical, as shown in Step 230. The User initiates seed treatment through the controller, as shown in Step 232. The controller generates a first flow signal, as shown in Step 234. The flow regulator receives the first flow signal, as shown in Step 248, and the flow regulator opens in response to the first flow signal, as shown in Step 250. The controller may generate a first source select signal, as shown in Step 236. The multi-port valve, if present, receives a first source select signal, as shown in Step 252, and opens the valve for the first agrochemical, as shown in Step 254. The Mass Flow Meter generates a first flow rate signal corresponding to the flow rate of the first agrochemical, as shown in Step 256. The controller monitors the first flow rate signal, as shown in Step 238. The mass flow meter also generates a first temperature signal corresponding to the temperature of the first agrochemical, as shown in Step 258. The controller monitors the first temperature signal, as shown in Step 240. The controller calculates the adjustments based on the first temperature signal to change one of more of the following treatment parameters: seed flow rate, drying drum retention time, drying drum rotation speed, conditioned air flow rate, conditioned air temperature, conditioned air humidity, or rotation speed of the atomizing disk, as shown in Step 242. Additionally, the controller may regulate the admission of supplemental water into the manifold 32 from a separate water source based on the direct inline measured temperature of the first agrochemical. The controller records the first temperature signal with the operational data of the seed treatment application, as shown in Step 244.

As shown in FIG. 6, the seed flow rates can be adjusted based on the measured mass flow signal of a liquid seed treatment formulation. After the system start 302, the User selects the treatment recipe and quantity, as shown in Step 304. Alternatively, the User may enter the treatment recipe and quantity, as shown in Step 306. If not already activated, the static flow rate pumps are activated for appropriate fluid sources according to the treatment recipe, as shown in Step 308. The flow regulators are proportionately opened for appropriate fluid sources according to the treatment recipe. The mass flow meter generates a real-time measured mass flow rate, which is received by the controller, as shown in Step 310. The seed flow rate is adjusted based on a measured mass flow rate of the seed treatment formulation, as shown in Step 312.

As shown in FIG. 7, the user can be alerted to verify appropriate seed treatment formulation and stop treatment based on a measured density range being out of tolerance. After the system start 320, the User selects the treatment recipe and quantity, as shown in Step 322. Alternatively, the User may enter the treatment recipe and quantity, as shown in Step 324. The static-rate pump is activated for appropriate liquid sources according to the treatment recipe, as shown in Step 326. The flow regulators are proportionately opened for appropriate fluid sources according to the treatment recipe. The mass flow meter generates real-time measured density signal for the seed treatment formulation, as shown in Step 328. The controller compares the measured seed treatment formulation density with the reference density value for the seed treatment formulation, as shown in Step 330. If the comparison is within tolerance levels, then the system continues to operate and receive the measured density signal, as shown in Step 332. If the comparison is outside of tolerance levels 334, then the system alerts the User to verify appropriate seed treatment formulation and stop seed treatment, as shown in Step 336.

Figure 8:
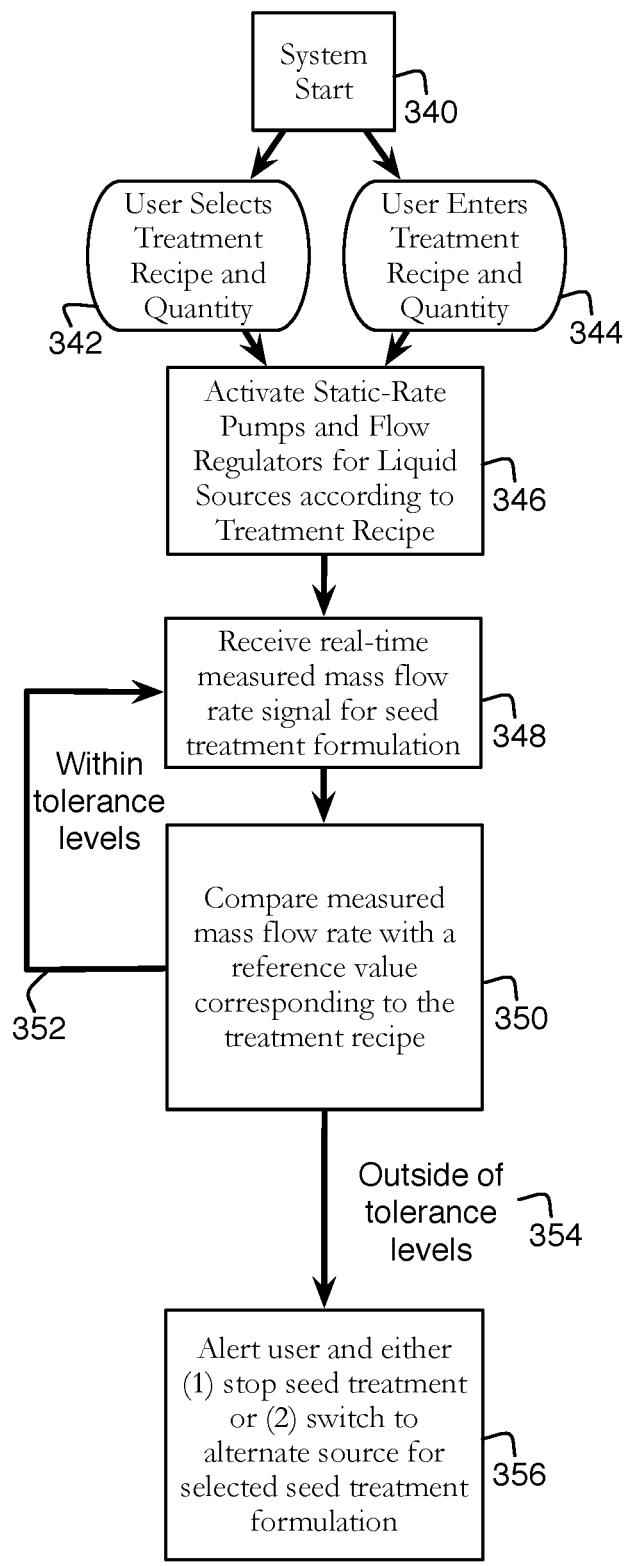
FIG. 8 shows a flow chart of a method for stopping seed treatment or switching to an alternate source for selected seed treatment formulation upon a measured flow rate being out of tolerance.

As shown in FIG. 8, the seed treatment system can stop treating seed or switching to an alternate source for selected seed treatment formulation upon a measured flow rate being out of tolerance. After the system start 340, the User selects the treatment recipe and quantity, as shown in Step 342. Alternatively, the User may enter the treatment recipe and quantity, as shown in Step 344. If not already activated, the static-rate pumps are activated for appropriate fluid sources according to the treatment recipe, as shown in Step 346. The flow regulators are proportionately opened for appropriate fluid sources according to the treatment recipe. The mass flow meter generates a real-time measured mass flow rate, which is received by the controller, as shown in Step 348. The controller compares the measured mass flow rate with a reference mass flow rate value corresponding to the selected treatment recipe, as shown in Step 350. If the comparison is within tolerance levels, then the system continues to operate and receive the measured density signal, as shown in Step 352. If the comparison is outside of tolerance levels 354, then the system may stop treatment and alert the User to switch to an alternate source for the selected seed treatment formulation, as shown in Step 356. If the system is configured with an electro-pneumatic multi-port valve, then the system generates a fluid source change signal to automatically switch from a first fluid source having the desired liquid seed treatment to a second fluid source having the desired liquid seed treatment. One advantage of the current disclosure is that the system can compensate for a change in density between a first liquid source containing a first treatment mixture of a liquid seed treatment having a first density and a second liquid source containing a second treatment mixture of the liquid seed treatment having a second density, where the first density is different than the second density. Existing systems would have to be recalibrated to compensate for the difference in density. This may be particularly advantageous when Users make their own seed treatment mixtures from solids or concentrate.

In one embodiment, the first liquid source 2 is disposed upon a first scale 8 and the second liquid source 4 is disposed upon a second scale 10. The first scale 8 and second scale 10 are operably connected to the controller to generate a weight signal corresponding to the real time weight of the respective liquid source and its contents. The weight signal can be converted to a loss-in-weight calculation to verify the mass flow meter. Alternatively, a first set of liquid sources may be metered using the mass flow meter and a second set of liquid sources may be metered using loss-in-weight calculation. Once the seed treatment fluid is applied to the exterior surface of the seed within the treatment chamber 66, the wet, freshly treated seed is deposited into the drying drum 62 for drying and polishing of the seed treatment.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

We claim:

1. A method for applying a liquid seed treatment with a seed treatment applicator to an agricultural seed within a treatment chamber, the method comprising:
   a. fluidly connecting a first liquid source to a multi-port valve, the first liquid source containing a first treatment mixture of a liquid seed treatment, wherein the first treatment mixture has a first density;
   b. fluidly connecting a second liquid source to the multi-port valve, wherein the second liquid source contains a second treatment mixture of a liquid seed treatment, wherein the second treatment mixture has a second density;
   c. selecting the first liquid source with the multi-port valve;
   d. pumping the liquid seed treatment with a liquid pump fluidly connected downstream of the multi-port valve, wherein the liquid pump is fluidly connected to a first modular control stick;
   e. generating a measured mass flow signal with a mass flow meter relative to a real time mass flow rate of the liquid seed treatment; and
   f. generating a switch signal with a flow meter transmitter when comparison of the measured mass flow signal deviates from a reference value corresponding to a desired flow rate.

2. The method of claim 1, further comprising the step of:
   a. switching the multi-port valve to select to the second liquid source upon generation of the switch signal.

3. The method of claim 2, wherein the step of generating the measured mass flow signal is accomplished by fluidly connecting the liquid pump to Coriolis mass flow meter downstream of the liquid pump.

4. The method of claim 3, further comprising the step of:
   a. adjusting the real time mass flow rate by commanding a flow control signal to a flow regulator fluidly connected downstream of the Coriolis mass flow meter in response to deviation of the measured mass flow signal from the reference value.

5. The method of claim 1, further comprising the step of:
   a. displaying a user error message upon generation of the switch signal.

6. The method of claim 1, further comprising the step of:
   a. generating a density signal relative to real time measurements of the liquid seed treatment.

7. A seed treatment applicator for applying a liquid seed treatment to an agricultural seed within a treatment chamber, the seed treatment applicator comprising:
   a. a multi-port valve;
   b. a first liquid source fluidly connected to the multi-port valve, the first liquid source configured to contain a first treatment mixture of a liquid seed treatment, wherein the first treatment mixture has a first density;
   c. a second liquid source fluidly connected to the multi-port valve, the second liquid source configured to contain a second treatment mixture of the liquid seed treatment, wherein the second treatment mixture has a second density;
   d. a liquid pump fluidly connected downstream of the multi-port valve;
   e. a first modular control stick comprising:
      i. a frame mounted to the treatment chamber;
      ii. a mass flow meter mounted to the frame and fluidly connected downstream of the liquid pump and configured to generate a measured mass flow signal relative to a real time mass flow rate of the liquid seed treatment; and
   f. a flow meter transmitter operably connected to the mass flow meter and configured to generate a switch signal when comparison of the measured mass flow signal deviates from a reference value corresponding to a desired flow rate.

8. The seed treatment applicator of claim 7, wherein the liquid pump is a static flow rate pump.

9. The seed treatment applicator of claim 8, wherein the first modular control stick further comprises:
   a. a flow regulator fluidly connected downstream of the mass flow meter.

10. The seed treatment applicator of claim 9, wherein the flow meter transmitter is further configured to:
    a. adjust a flow rate of the liquid seed treatment by commanding a flow control signal to the flow regulator in response to deviation of the measured mass flow signal from a reference value corresponding to a desired flow rate; and
    b. generate a switch signal when the flow control signal is unable to correct the deviation of the measured mass flow signal with the reference value.

11. The seed treatment applicator of claim 7, wherein the multi-port valve is an electro-pneumatic valve configured to switch liquid fluid source upon generation of the switch signal.

12. The seed treatment applicator of claim 7, further comprising:
    a. a controller having a user interface, the controller operably connected to the flow meter transmitter and configured to display a user error message upon generation of the switch signal.

13. The seed treatment applicator of claim 7, wherein the flow meter transmitter is further configured to generate a measured density signal relative to real time measurements of the liquid seed treatment through the mass flow meter.

14. The seed treatment applicator of claim 13, further comprising:
    a. a controller operably connected to the flow meter transmitter and configured to display a user error message when the measured density signal deviates from a reference density value associated with the liquid seed treatment.

15. A seed treatment applicator for applying a liquid seed treatment to an agricultural seed within a treatment chamber, the seed treatment applicator comprising:
    a. a first liquid source configured to contain a first treatment mixture of a liquid seed treatment, wherein the first treatment mixture has a first density;
    b. a liquid pump fluidly connected downstream of the first liquid source;
    c. a density meter fluidly connected downstream of the liquid pump and configured to generate a measured density signal relative to a real time density of the liquid seed treatment; and
    d. a controller operably connected to the density meter and configured to generate an alert signal when comparison of the measured density signal deviates from a reference density value associated with the liquid seed treatment.

16. The seed treatment applicator of claim 15, wherein the density meter is a Coriolis mass flow meter.

17. The seed treatment applicator of claim 15, wherein the controller is further configured to display a user error message upon generation of the alert signal.

18. The seed treatment applicator of claim 15, further comprising:
  a. a second liquid source configured to contain a second treatment mixture of the liquid seed treatment, wherein the second treatment mixture has a second density;
  b. a multi-port valve being an electro-pneumatic valve selectively fluidly connected to switch between the first liquid source and the second liquid source, wherein the multi-port valve is upstream of the liquid pump; and
  c. wherein the multi-port valve is configured alternate between the first liquid source and the second liquid source upon generation of the alert signal.

* * * * *